US012591965B2

(12) United States Patent

Nikolakakis et al.

(10) Patent No.: US 12,591,965 B2

(45) Date of Patent: Mar. 31, 2026

(54) SYSTEMS AND METHODS FOR DETECTING, IDENTIFYING, LOCALIZING, AND DETERMINING THE CHARACTERISTICS OF FIELD ELEMENTS IN AGRICULTURAL FIELDS

(71) Applicant: AUGMENTA AGRICULTURE TECHNOLOGIES SMPC, Neas Ionias (GR)

(72) Inventors: Alexandros Emmanouil Nikolakakis, Kifisia (GR); Georgios Varvarelis, Volos (GR); Aikaterini Karakoula, Athens (GR); Spyridon Evangelatos, Cholargos (GR)

(73) Assignee: AUGMENTA AGRICULTURE TECHNOLOGIES SMPC, Neas Ionias (GR)

( * ) Notice: Subject to any disclaimer, the term of this patent is extended or adjusted under 35 U.S.C. 154(b) by 0 days.

(21) Appl. No.: 18/119,984

(22) Filed: Mar. 10, 2023

(65) Prior Publication Data

US 2023/0252625 A1     Aug. 10, 2023

Related U.S. Application Data

(63) Continuation-in-part of application No. 17/748,950, filed on May 19, 2022.

(Continued)

(51) Int. Cl.
| | |
|---|---|
| *G06T 7/00* | (2017.01) |
| *A01D 75/00* | (2006.01) |
| *G06T 7/80* | (2017.01) |

(52) U.S. Cl.
CPC ............ *G06T 7/0012* (2013.01); *A01D 75/00* (2013.01); *G06T 7/85* (2017.01); *G06T 2207/10036* (2013.01)

(58) Field of Classification Search
CPC .................... G06T 7/0012; G06T 7/85; G06T 2207/10036; A01D 75/00
See application file for complete search history.

(56) References Cited

U.S. PATENT DOCUMENTS

| | | | |
|---|---|---|---|
| 6,160,902 A | 12/2000 | Dickson et al. | |
| 7,570,783 B2 * | 8/2009 | Wei ...................... | A01B 69/008 382/164 |

(Continued)

FOREIGN PATENT DOCUMENTS

| | | |
|---|---|---|
| EA | 202393284 | 2/2024 |
| EA | 202492352 | 12/2024 |

(Continued)

OTHER PUBLICATIONS

"International Application Serial No. PCT EP2023 056249, International Preliminary Report on Patentability mailed Jun. 21, 2024", 15 pgs.

(Continued)

*Primary Examiner* — Lisa M Caputo
*Assistant Examiner* — Nyla Gavia
(74) *Attorney, Agent, or Firm* — Schwegman Lundberg & Woessner, P.A.

(57)     ABSTRACT

An imaging system usable with an agricultural operations vehicle as the agricultural operations vehicle moves through a field includes a stereoscopic multispectral imaging sensor configured to capture images of the field in real time; a processor; and a memory. The memory includes instructions, stored thereon, which when executed by the processor cause the imaging system to: capture a real-time image by the stereoscopic multispectral imaging sensor; determine characteristics of field elements within the field based on the real-time image, wherein one of the determined characteristics of the field elements is a vegetation index; determine a morphology of the field in which the agricultural opera- (Continued)

300 tions vehicle is moving based on the captured real-time image; combine as data the real-time image, the determined characteristics of the detected field elements, and the determined field morphology; and determine a location of the detected field elements based on the combined data.

18 Claims, 9 Drawing Sheets

Related U.S. Application Data

(60) Provisional application No. 63/319,215, filed on Mar. 11, 2022, provisional application No. 63/190,622, filed on May 19, 2021.

(56) References Cited

U.S. PATENT DOCUMENTS

| | | | |
|---|---|---|---|
| 10,244,670 B2 | 3/2019 | Ito et al. | |
| 10,255,670 B1 | 4/2019 | Wu et al. | |
| 10,455,826 B2 | 10/2019 | Palomares et al. | |
| 10,548,306 B2 | 2/2020 | Albert et al. | |
| 11,076,589 B1 | 8/2021 | Sibley et al. | |
| 11,093,745 B2 | 8/2021 | Redden et al. | |
| 11,425,852 B2 | 8/2022 | Sibley et al. | |
| 11,517,008 B1 | 12/2022 | Sibley et al. | |
| 2016/0055592 A1* | 2/2016 | Groeneveld | G06Q 40/08 |
| | | | 705/4 |
| 2019/0369009 A1 | 12/2019 | Wolf | |
| 2020/0132651 A1* | 4/2020 | McPeek | G01B 5/0035 |
| 2020/0193589 A1* | 6/2020 | Peshlov | G06V 20/188 |
| 2020/0304699 A1 | 9/2020 | Basnet et al. | |
| 2021/0000006 A1 | 1/2021 | Ellaboudy et al. | |
| 2021/0149406 A1* | 5/2021 | Javault | A01C 21/005 |
| 2021/0153500 A1* | 5/2021 | Kuenzi | G06V 10/56 |
| 2021/0406539 A1* | 12/2021 | Lo | G06V 20/20 |
| 2022/0044044 A1* | 2/2022 | Peake | H04N 25/131 |
| 2022/0369534 A1 | 11/2022 | Nikolakakis et al. | |

FOREIGN PATENT DOCUMENTS

| | | |
|---|---|---|
| WO | 2022243944 | 11/2022 |
| WO | 2023170306 | 9/2023 |

OTHER PUBLICATIONS

"U.S. Appl. No. 17/748,950, Non Final Office Action mailed Aug. 21, 2024", 36 pgs.

"Canadian Application Serial No. 3,219,004, Examiners Rule 86(2) Report mailed Aug. 26, 2024", 8 pgs.

"International Application Serial No. PCT IB2022 054710, International Search Report mailed Sep. 5, 2022", 4 pgs.

"International Application Serial No. PCT IB2022 054710, Written Opinion mailed Sep. 5, 2022", 6 pgs.

"International Application Serial No. PCT IB2022 054710, Written Opinion mailed Apr. 12, 2023", 12 pgs.

"It's AI vs. Weeds-How multispectral cameras are supplying intellegence to Intellgent Farming", JAI Blog, [Online]. Retrieved from the Internet: URL: https: news.jai.com blog -its-ai-vs.-weeds.-how-multi-spectral-cameras-are-supplying-intelligence-to-intelligent-farming Retrieved on Dec. 4, 2021, (Feb. 20, 2020), 4 pgs.

"International Application Serial No. PCT IB2022 054710, International Preliminary Report on Patentability mailed Jul. 25, 2023", 10 pgs.

"International Application Serial No. PCT EP2023 056249, International Search Report mailed Jun. 2, 2023", 5 pgs.

"International Application Serial No. PCT EP2023 056249, Written Opinion mailed Jun. 2, 2023", 8 pgs.

Gaines, Tharran, "The Future of Robotic Weeders", Successful Farming, 2018., [Online]. Retrieved from the Internet: URL: https:

www.agriculture.com technology robotics the-future-of-robotic-weeders Retrieved on Dec. 4, 2021, (Nov. 29, 2018), 9 pgs.

Haug, Sebastian, "Plant classification system for crop weed discrimination without segmentation", IEEE Winter Conference on Applications of Computer Vision, IEEE, (Mar. 24, 2014), 8 pgs.

Lottes, P, "An effective classification system for separating sugar beets and weeds for precision farming applications", IEEE International Conference on Robotics and Automation (ICRA), IEEE, (May 16, 2016), 5157-5163.

Pire, T., "Weed removing robot and its sensors", Researchgate, 2021., [Online]. Retrieved from the Internet: URL: https: www. researchgate.net figure The-weed-removing-robot-and-its-sensors-The-right-camera-coordinate-frame-is-not-shown fig1_ 332283456 Retrieved on Dec. 4, 2021, (Dec. 4, 2021), 10 pgs.

Pretto, Alberto, "Building an Aerial-Ground Robotics System for Precision Farming: An Adaptable Solution", IEEE Robotics and Automation Magazine, IEEE Service Center, Piscataway, NJ, US, vol. 28, No. 3, (Aug. 25, 2020), 29-49.

Rovira-Mas, Francisco, "Sensor Architecture and Task Classification for Agricultural Vehicles and Environments", Sensors 2010, 10, 11226-11247; doi: 10.3390 s101211226., (Dec. 8, 2010), 22 pgs.

Underwood, James, "Efficient in-field plant phenomics for row-crops with an autonomous ground vehicle", Journal of Field Robotics, [Online] vol. 34, No. 6, (May 29, 2017), 1061-1083.

Wendel, Alexander, "Self-supervised weed detection in vegetable crops using ground based hyperspectral imaging", IEEE International Conference on Robotics and Automation (ICRA), IEEE, (May 16, 2016), 5128-5135.

"Australian Application Serial No. 2022278034, First Examination Report mailed Oct. 30, 2024", 2 pgs.

"U.S. Appl. No. 17/748,950, Response filed Jan. 21, 2025 to Non Final Office Action mailed Aug. 21, 2024", 21 pgs.

"Eurasian Application Serial No. 202492352, Office Action mailed Jan. 9, 2025", w English translation, 6 pgs.

"Canadian Application Serial No. 3,219,004, Response filed Jan. 29, 2025 to Examiners Rule 86(2) Report mailed Aug. 26, 2024", 28 pgs.

"Australian Application Serial No. 2022278034, Response filed Feb. 26, 2025 to First Examination Report mailed Oct. 30, 2024", 22 pgs.

"U.S. Appl. No. 17/748,950, Non Final Office Action mailed Apr. 9, 2025", 47 pgs.

"European Application Serial No. 23711030.9, Response to Communication Pursuant to Rules 161 and 162 EPC filed Apr. 17, 2025", with English claims, 17 pages.

"New Zealand Application Serial No. 806472, First Examiner Report mailed Jun. 27, 2025", 3 pages.

"Eurasian Application Serial No. 202492352, Response filed Jul. 1, 2025 to Office Action mailed Jan. 9, 2025", with English claims, 22 pages.

"European Application Serial No. 25175536.9, Invitation to remedy deficiencies (R. 58 EPC) mailed May 20, 2025", 1 pages.

"European Application Serial No. 25175536.9, Response filed Jul. 21, 2025 to Invitation to remedy deficiencies (R. 58 EPC) mailed May 20, 2025", 6 pages.

"Canadian Application Serial No. 3,245,684, Examiners Rule 862 Report mailed Oct. 22, 2025", 10 pgs.

Honkavaara, Eija, "Processing and Assessment of Spectrometric, Stereoscopic Imagery Collected Using a Lightweight UAV Spectral Camera for Precision Agriculture", MDPI Open Access Journals, Remote Sens. 2013, 5, www.mdpi.com journal remotesensing, Oct. 4, 2013, 5006-5039.

"U.S. Appl. No. 17/748,950, Examiner Interview Summary mailed Sep. 29, 2025", 2 pgs.

"U.S. Appl. No. 17/748,950, Response filed Oct. 9, 2025 to Non Final Office Action mailed Apr. 9, 2025", 17 pgs.

"U.S. Appl. No. 17/748,950, Notice of Allowance mailed Nov. 3, 2025", 9 pgs.

"Australian Application Serial No. 2023230030, First Examination Report mailed Dec. 5, 2025.", 4 pgs.

(56)                References Cited

OTHER PUBLICATIONS

"New Zealand Application Serial No. 806472, Response filed Jan. 20, 2026 to First Examiner Report mailed Jun. 27, 2025", 46 pgs.

* cited by examiner

Field of view of camera system

300

1002

Working width

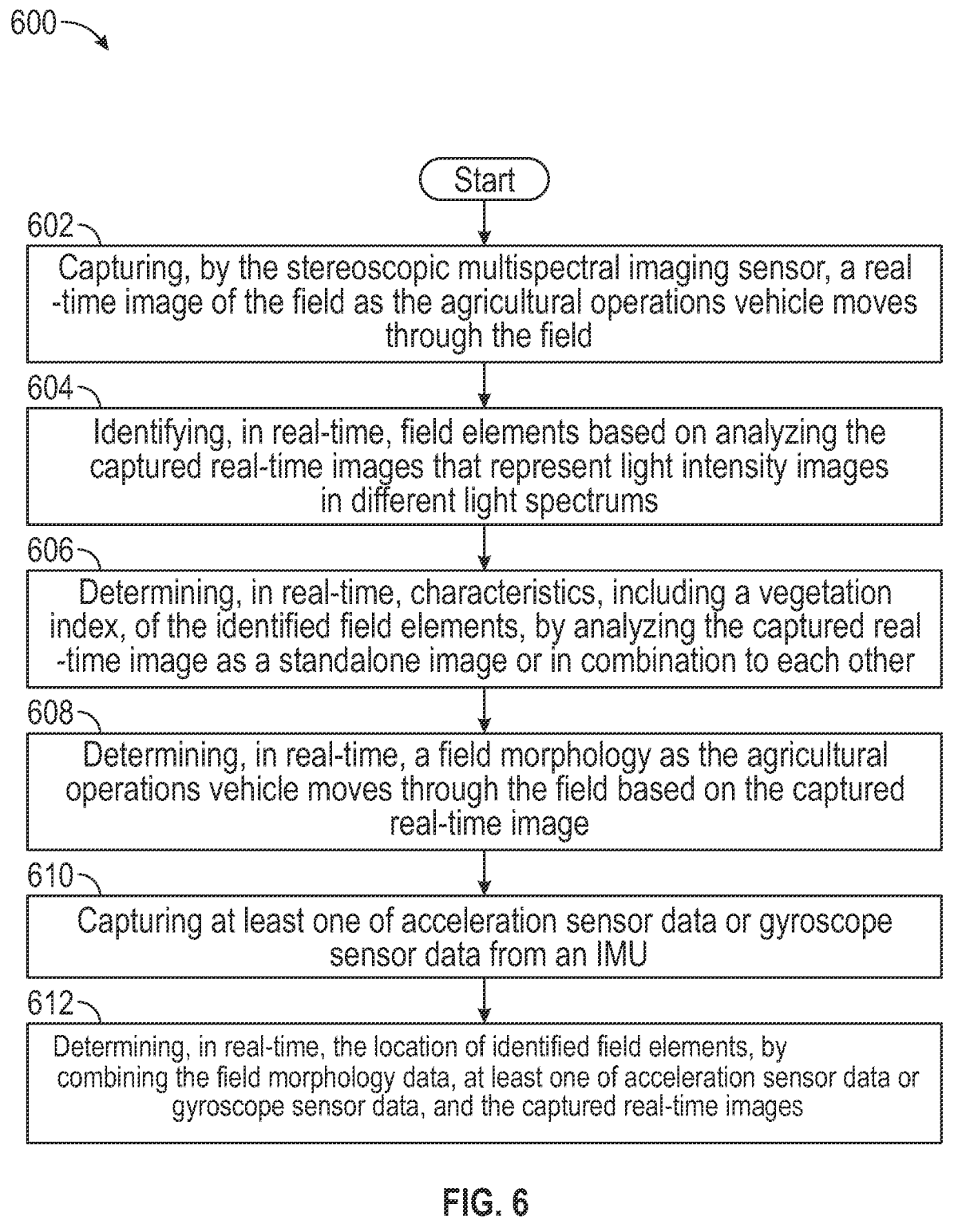

600

Start

602

Capturing, by the stereoscopic multispectral imaging sensor, a real-time image of the field as the agricultural operations vehicle moves through the field

604

Identifying, in real-time, field elements based on analyzing the captured real-time images that represent light intensity images in different light spectrums

606

Determining, in real-time, characteristics, including a vegetation index, of the identified field elements, by analyzing the captured real-time image as a standalone image or in combination to each other

608

Determining, in real-time, a field morphology as the agricultural operations vehicle moves through the field based on the captured real-time image

610

Capturing at least one of acceleration sensor data or gyroscope sensor data from an IMU

612

Determining, in real-time, the location of identified field elements, by combining the field morphology data, at least one of acceleration sensor data or gyroscope sensor data, and the captured real-time images

FIG. 6

SYSTEMS AND METHODS FOR DETECTING, IDENTIFYING, LOCALIZING, AND DETERMINING THE CHARACTERISTICS OF FIELD ELEMENTS IN AGRICULTURAL FIELDS

CROSS-REFERENCE TO RELATED APPLICATIONS

The present application claims the benefit of and priority to U.S. Provisional Patent Application Ser. No. 63/319,215, filed on Mar. 11, 2022, and is a continuation in part of U.S. patent application Ser. No. 17/748,950, filed on May 19, 2022, which claims the benefit of and priority to U.S. Provisional Patent Application Ser. No. 63/190,622 filed on May 19, 2021, the entire content of each is hereby incorporated by reference. The present application is also related to a PCT application having Application number PCT/IB2022/054710 filed on May 19, 2022, the entire content of which is hereby incorporated by reference.

TECHNICAL FIELD

The present disclosure relates to detecting, identifying, localizing, and/or determining the characteristics of field elements and/or field morphology in agricultural fields.

BACKGROUND

The excess use of pesticide chemicals has a negative impact on multiple fronts, such as the cost of the field operation (these types of chemicals have a high cost), the environment, and residual chemicals in the crop yield. Thus, there is an ongoing global effort to reduce the use of chemicals applied and to create legislation and stricter regulations that will eventually enforce the reduction of the use of chemicals in agriculture.

Accordingly, there is interest in systems and methods to reduce the use of chemicals in agriculture.

SUMMARY

In an aspect of the present disclosure, an imaging system usable with an agricultural vehicle as the agricultural vehicle moves through a field includes a stereoscopic multispectral imaging sensor configured to capture images of the field in real-time, a processor, and a memory. The memory includes instructions stored thereon, which, when executed by the processor, cause the imaging system to: capture real-time images by the stereoscopic multispectral imaging sensor; determine characteristics of field elements within the field in which the agricultural vehicle is moving based on the real-time images; determine a morphology of the field in which the agricultural vehicle is moving based on the captured real-time images; combine the real-time images, the determined characteristics of the detected field elements, and the determined field morphology; and determine a location of the detected field elements based on the combined real-time images, determined characteristics of the detected field elements, and the determined field morphology. One of the determined characteristics of the field elements is a vegetation index.

In another aspect of the present disclosure, the instructions, when executed by the processor, may further cause the imaging system to determine optimized parameters of the agricultural operation conducted by the agricultural vehicle based on the determined location and the characteristics of the identified field elements.

In yet another aspect of the present disclosure, the instructions, when executed by the processor, may further cause the imaging system to communicate the determined parameters to an agricultural vehicle controller for controlling parameters of the agricultural operation.

In a further aspect of the present disclosure, each pixel of the captured images is assigned a pixel value representing a light intensity measurement in a light spectrum space.

In yet a further aspect of the present disclosure, the stereoscopic multispectral imaging sensor may acquire images containing an entire operational working width of the agricultural vehicle using wide-angle lenses.

In an aspect of the present disclosure, the imaging system may further include an Inertial Measurements Unit sensor (IMU) configured to capture acceleration and/or gyro measurements as the agricultural vehicle moves through the field.

In another aspect of the present disclosure, the instructions, when executed, may further cause the imaging system to capture acceleration and gyro measurements as sensor data as the agricultural vehicle moves through the field and further combine the real-time images, the determined characteristics of the detected field elements, the determined field morphology, with the sensor data captured by the IMU for determining the location of the detected field elements.

In an aspect of the present disclosure, a method for detecting, identifying, localizing, and/or determining characteristics of field elements and field morphology in agricultural fields in real-time using a stereoscopic multispectral imaging sensor mounted on an agricultural vehicle is presented. The method includes capturing, by the stereoscopic multispectral imaging sensor, real-time images of the field as the agricultural vehicle moves through the field; identifying, in real-time, field elements based on analyzing the captured real-time images as light-intensity images in different light spectrums; determining, in real-time, characteristics, including a vegetation index, of the identified field elements, by analyzing the captured real-time images as a standalone image or in combination with each other; determining, in real-time, a field morphology as the agricultural vehicle moves through the field based on the captured real-time images; accessing at least one of acceleration sensor data or gyroscope sensor data from an IMU; and determining, in real-time, a location of identified field elements by combining the field morphology, the captured real-time images, and at least one of the acceleration sensor data or the gyroscope sensor data. Each pixel of the captured images is assigned a pixel value representing a light intensity measurement in a light spectrum. The stereoscopic multispectral imaging sensor is configured to acquire real-time images containing an entire operational working width of the agricultural vehicle using wide-angle lenses.

In another aspect of the present disclosure, the method may further include determining in real-time agricultural operation parameters corresponding to a specific field element of the field elements based on the determined location and characteristics of the specific field element.

In yet another aspect of the present disclosure, the determined parameters may be communicated to a controller of the agricultural vehicle to adjust the agricultural operation parameters.

In yet another aspect of the present disclosure, the method may further include detecting, identifying, and localizing weeds as the agricultural vehicle moves through a field based on the determined location.

In a further aspect of the present disclosure, the method may further include determining an amount of a substance to be applied on each of the detected, identified, and localized field elements based on the determined characteristics, and communicating with a controller of the agricultural vehicle to apply the determined amount of the substance on the determined location of the field element.

In an aspect of the present disclosure, a processor-implemented method of using an imaging sensor apparatus mounted on an agricultural vehicle as the agricultural vehicle moves through a field to eliminate weeds in a till or no-till field in real-time is described. The method includes accessing real-time images; determining, in real-time, characteristics, including a vegetation index, of the identified field elements; detecting field elements in real-time using the vegetation index; identifying potential weeds based on comparing the vegetative index to a threshold; determining an application rate based on the determined characteristics of the identified weeds; and localizing the identified weeds based on sensor data.

In another aspect of the present disclosure, the method may further include determining an amount of a substance to be applied on each of the detected, identified, and localized field elements based on the determined characteristics.

In yet another aspect of the present disclosure, the method may further include communicating with a controller of the agricultural vehicle to apply the determined amount of the substance on the determined location of the field element.

In yet another aspect of the present disclosure, the sensor data may include at least one of GPS sensor data, gyroscope data, or accelerometer data.

In a further aspect of the present disclosure, the real-time images may be captured by a stereoscopic multispectral imaging sensor.

In an aspect of the present disclosure, each pixel of the captured real-time images may be assigned a pixel value representing a light intensity measurement in a light spectrum.

In another aspect of the present disclosure, the stereoscopic multispectral imaging sensor may be configured to acquire real-time images containing an entire operational working width of the agricultural vehicle using wide-angle lenses.

In yet another aspect of the present disclosure, the vegetation index of the identified field elements may be determined by analyzing the accessed real-time images of the field in different light spectrums.

Further details and aspects of the present disclosure are described in more detail below with reference to the appended figures.

BRIEF DESCRIPTION OF THE DRAWINGS

A better understanding of the features and advantages of the present disclosure will be obtained by reference to the following detailed description that sets forth illustrative aspects, in which the principles of the present disclosure are utilized, and the accompanying figures of which:

FIG. 6 is a flow diagram for a method for detecting, identifying, localizing, and/or determining characteristics of field elements, in accordance with aspects of the present disclosure;

DETAILED DESCRIPTION

Figure 1:
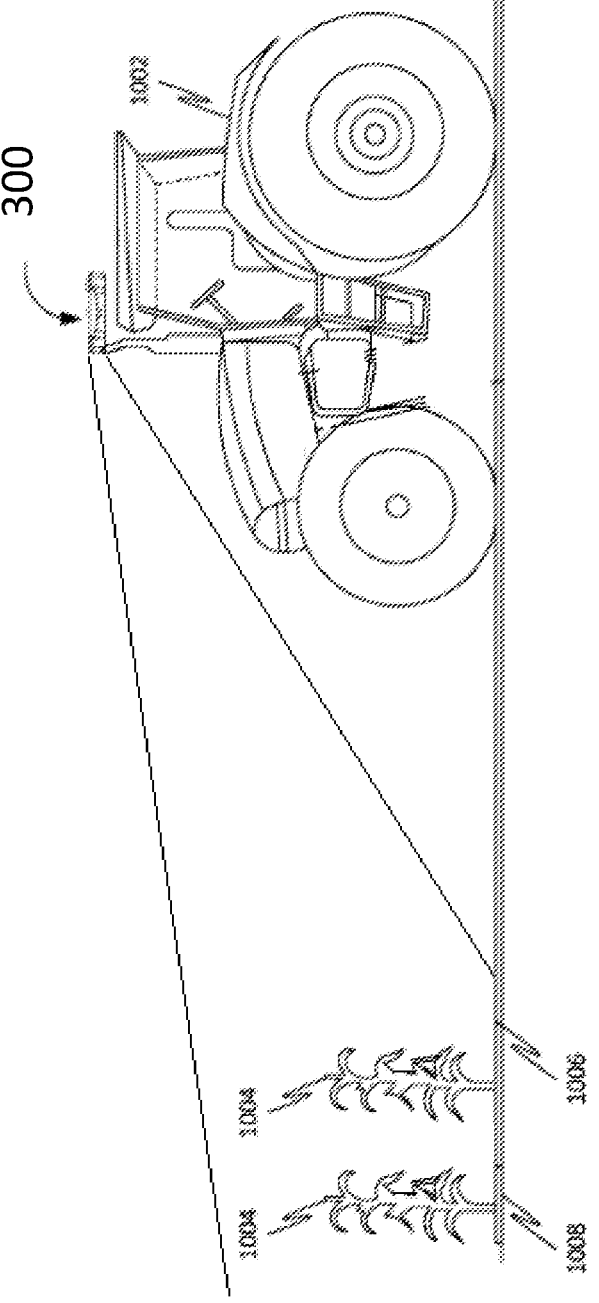
FIG. 1 is a side view of an imaging system mounted to the top of an agricultural vehicle, in accordance with aspects of the present disclosure.

The present disclosure relates to detecting, identifying, localizing, and/or determining the characteristics of field elements and/or field morphology in agricultural fields.

Aspects of the present disclosure are described in detail with reference to the figures, wherein like reference numerals identify similar or identical elements.

Although the present disclosure will be described in terms of specific aspects and examples, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary aspects illustrated in the figures, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure.

Currently, it is challenging to accurately detect, identify, localize, and determine the characteristics of field elements and field morphology in agricultural fields for the entire working width of agricultural equipment using a single embodiment system. In order to cover the entire working width with the desired accuracy, multiple embodiments are typically used, making the resulting system complex, expensive, and difficult to install. The presently disclosed technology is configured to provide information about field elements and field morphology, which is easily retrofitted to existing agricultural equipment, on which, in most cases, the presently disclosed technology may be mounted on the roof of the agricultural equipment. This way, the installation effort is minimized, as well as the associated cost. As used herein, working width includes the width in which the chemical is sprayed at any given time as the sprayer moves forward.

The disclosed technology provides the means for agricultural equipment to apply chemical substances on fields where needed, at the needed amount. In most cases, agricultural equipment applies a fixed amount of chemical substance (per specific area). The reason for that is that with the vast majority of existing equipment, it is not possible to determine in real-time and during the operation, where and how much chemical needs to be applied. There are retrofit solutions to achieve a reduction of chemical use in the described application. However, these solutions have a very high cost and are complex to install and maintain.

More specifically, existing systems mount sensing/imaging devices along a spraying boom (in most solutions, a device per spray nozzle is used). The sensing elements normally face downwards and in the front of the spray boom in order to detect plants and control the spray valve in order to apply the needed chemicals. Although the fact that the sensing element is close to the field surface provides benefits in terms of accuracy and direct control of the spray valve, there are several drawbacks to this implementation. Since each device corresponds to an operating width of less than a few meters (typically about 0.5 to about 1 meter), multiple devices are needed for installing such systems on an average sprayer. Typical sprayers are in the range of about 32 to about 42 meters wide. The need for more than 20 (typically 40 to 80 devices) per sprayer makes such a solution very costly, as a single device must consist of an environmentally sealed enclosure, a sensor, a processing unit, and a method to control the spray valve. The high cost of such solutions is, in most cases, not justified when compared to the benefit it brings. The installation of such a system involves mounting the devices on the boom, therefore making the installation time intensive and complex. In many cases, the boom needs to be entirely replaced. The devices are mounted close to the spray nozzles, which results in the need to remove chemical residue, dirt (or other factors) that cover the sensing elements and interfere with their measurements.

The presently disclosed technology provides the benefit of improving and optimizing agricultural operations, one of which can be reducing excess chemical usage by modifying in real-time the dosage of an applied substance. This can be achieved by determining the required dosage by detecting, and identifying field elements, localizing field elements, determining characteristics of field elements, and/or determining field morphology in agricultural fields in real-time.

Referring to FIG. 1, a side view of an imaging system 300 configured for detecting, identifying field elements, localizing field elements, determining characteristics of field elements, and/or determining field morphology in agricultural fields in real-time is shown. The imaging system 300 is configured to capture real-time multispectral images of field elements 1004 (e.g., crops, weeds) and/or fields 1006 and may be mounted on an agricultural vehicle 1002, such as a tractor or agricultural equipment (more specifically, equipment that can have the functionality of applying chemical (or any other) substances to a crop field or any other field grown on agricultural land, or perform operations in the field like harvesting, tilling, etc.). The agricultural vehicle 1002 may include, for example, farming equipment, a farming vehicle, an agricultural operations vehicle, and/or a tractor. The agricultural vehicle 1002 is configured to perform at least one agricultural operation on the field elements 1004. The agricultural operation may include harvesting, sowing, tilling, fertilizing, etc. The agricultural vehicle 1002 may include a plurality of sprayers (not shown) configured for spraying a substance (such as fertilizer or weed killer), one or more actuators (not shown) for controlling the amount of substance to be sprayed, and a controller (not shown) configured for controlling the actuators.

A benefit of the imaging system 300 being mounted on the roof or other high point of agricultural vehicle 1002 is that the imaging system 300 is not affected by chemical residue, dirt, and other factors that interfere with the sensing elements of systems that are mounted close to the nozzles that apply chemicals.

Figure 3:
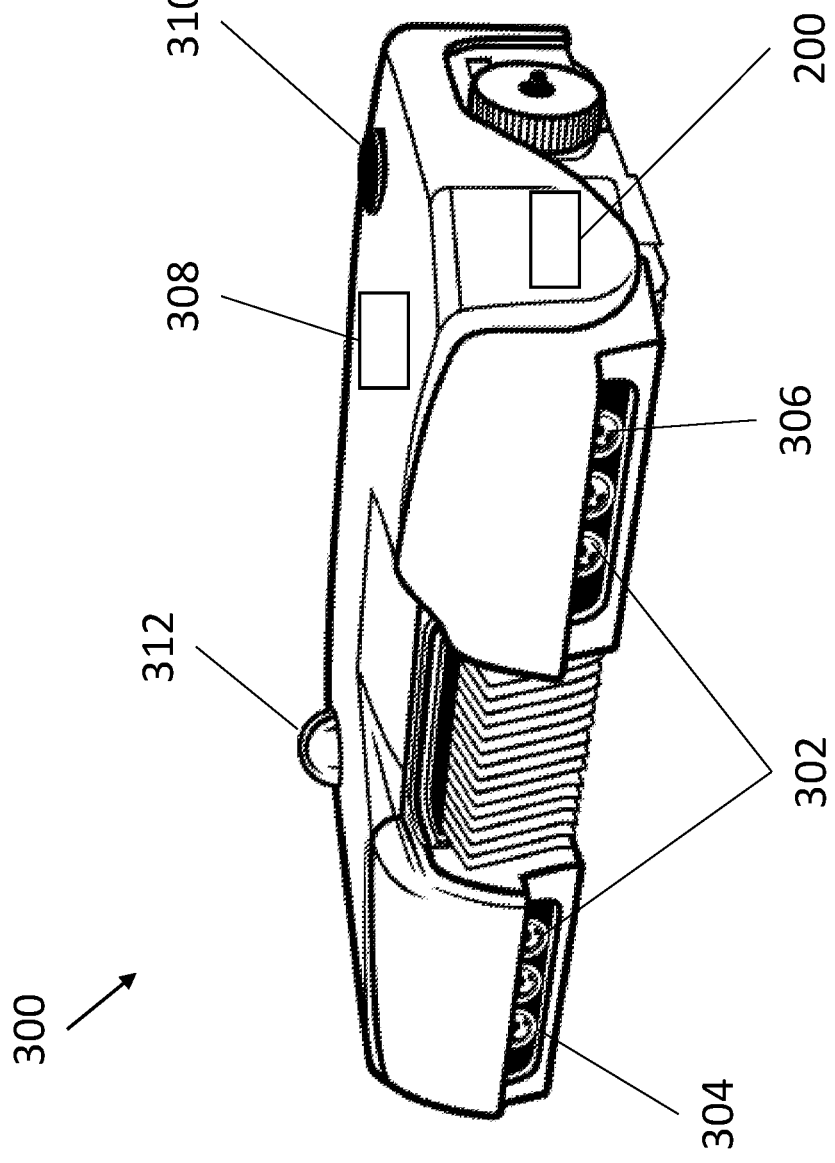
FIG. 3 is a perspective view of the imaging system of FIG. 1, in accordance with aspects of the present disclosure.

The imaging system 300 is configured to be usable with the agricultural vehicle 1002, as the agricultural vehicle 1002 moves through a field 1006 to generate measurements of the field elements 1004 and/or one or more fields 1006. The imaging system 300 integrates a front-facing (as opposed to downwards-facing in other solutions) wide-lens, stereoscopic multispectral imaging sensor 302 (FIG. 3).

The imaging system 300 is configured to detect, identify, and determine the exact location of field elements 1004 in the entire working width of the agricultural machinery in real-time. Furthermore, the imaging system 300 is configured to capture information and calculate field morphology by combining information from cameras, stereo cameras, and other sensors. In aspects, the determined location of the field elements may be relative or absolute.

The imaging system 300 is configured to improve multiple types of operations, such as, weed detection and elimination, tilling, harvesting, and controlling parameters of these operations based on the collected and processed information. Therefore, the imaging system 300 can provide solutions to multiple types of operations, thus minimizing the cost per operation.

The imaging system 300 utilizes a wide lens and is positioned substantially oriented in the horizontal axis. The imaging system 300 is configured to capture images in multiple wavelengths of the light spectrum. The imaging system 300 can detect, distinguish and identify field elements in a field with better accuracy, compared to standard RGB cameras, due to the generation ability to generate high contrast overlaying images. Using images of the same area but acquired in different wavelengths of light, the imaging system 300 can much more easily distinguish plants from soil or other elements. Therefore, the imaging system 300 can detect and identify plants and other field elements in a field from a much greater distance compared to RGB cameras.

Furthermore, by comparing images in different wavelengths of the light spectrum, the generated information is much less affected by differences in lighting conditions, enabling the imaging system 300 to detect plants/weeds with improved reliability at a greater distance compared to RGB cameras. Thus, the presently disclosed technology provides the benefit over traditional RGB imaging systems, which are unable to detect small weeds at a distance.

Figure 2:
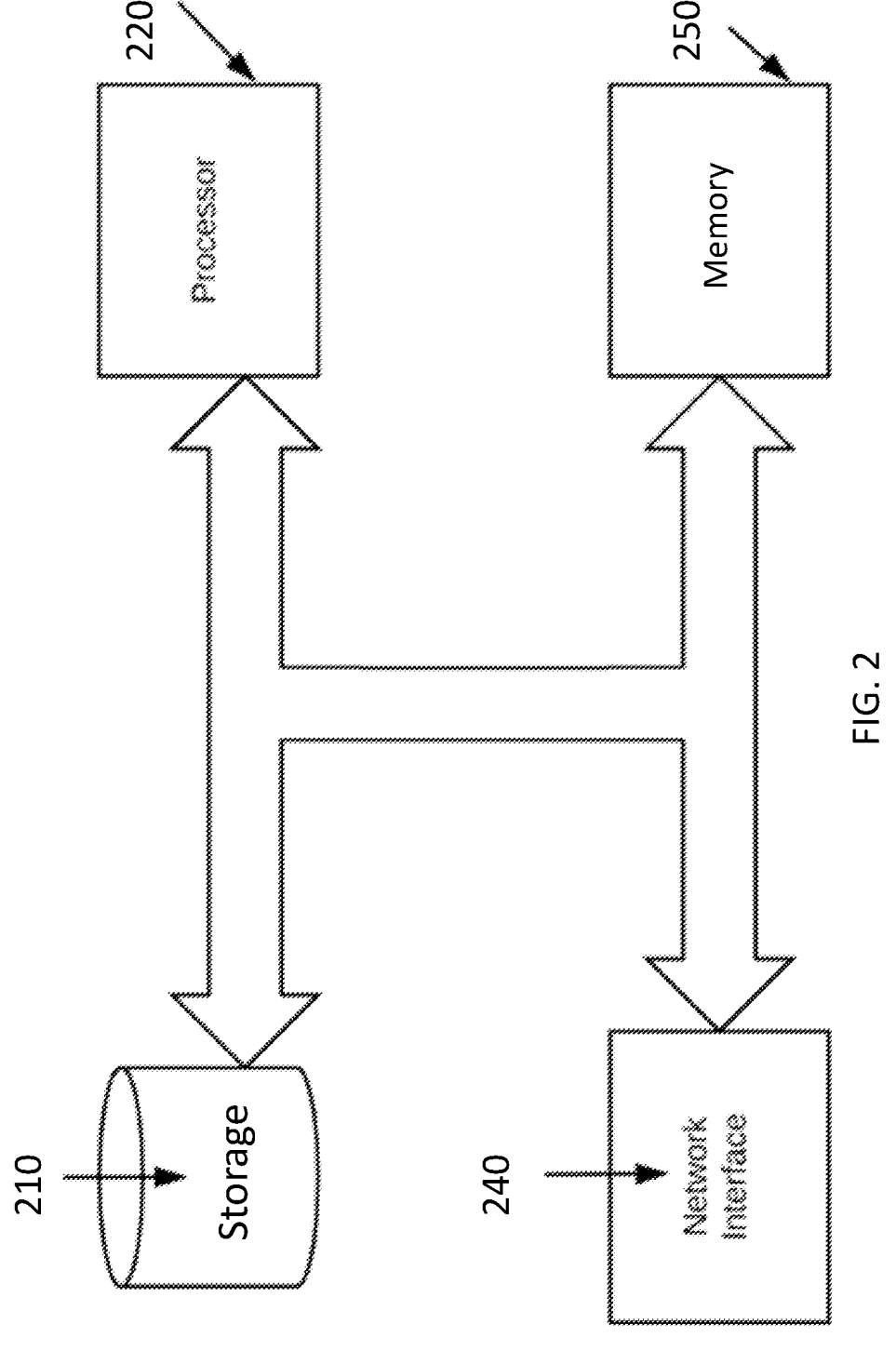
FIG. 2 is a block diagram of a controller configured for use with the imaging system of FIG. 1, in accordance with aspects of the present disclosure.

FIG. 2 illustrates controller 200 includes a processor 220 connected to a computer-readable storage medium or a memory 230. The controller 200 may be used to control and/or execute operations of the imaging system 300. The computer-readable storage medium or memory 230 may be a volatile type of memory, e.g., RAM, or a non-volatile type of memory, e.g., flash media, disk media, etc. In various aspects of the disclosure, the processor 220 may be another type of processor, such as a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data. The disclosed method may run on the controller 200 or on a user device, including, for example, on a mobile device, an IoT device, or a server system.

Referring to FIG. 3, the imaging system 300 is shown. The imaging system 300 generally includes a stereoscopic multispectral imaging sensor 302 configured to capture real-time images at a plurality of wavelengths of light (e.g., visible light, near IR, IR, ultraviolet, etc.), a controller 200 (FIG. 2), and an Inertial Measurement Unit (IMU) 306. In aspects, the imaging system 300 may include a GPS receiver 304. The stereoscopic multispectral imaging sensor 302 may include one or more sensors, for example, an infrared (IR) sensor, a red light sensor, and/or a sensor of another spectrum of light. In aspects, the stereoscopic multispectral imaging sensor 302 may include one or more CMOS sensors. In aspects, the imaging system 300 may include a light sensor 310 configured to detect ambient light levels. The controller 200 may use the captured ambient light levels to determine an index correction factor for correcting or calibrating the vegetation index.

The imaging system 300 is configured for capturing real-time images and/or video for the entire operating width of the agricultural machinery in a more efficient and reliable way compared to standard RGB cameras by using multispectral imaging. Multispectral imaging involves capturing images of a scene or object over multiple discrete wavelength bands and extracting spectral content from that data. Multispectral imaging captures image data within wavelength ranges across the electromagnetic spectrum. The wavelengths may be separated by filters or detected with the use of components that are sensitive to particular wavelengths, including light from frequencies beyond the visible light range, i.e., IR and ultra-violet light.

The stereoscopic multispectral imaging sensor 302 enables detailed measurements of the morphology of the field to be acquired and/or calculated, as well as the position and orientation with respect to the part of the field scanned. The stereoscopic multispectral imaging sensor 302 is configured to provide distance and/or depth information for objects in the captured images. The stereoscopic multispectral imaging sensor 302 includes a wide-angle lens. The wide-angle lens (for example, an angle of view of about 90° to about 150°) is configured to encompass the entire operating width of the agricultural machinery (typically a width of about 20 to about 46 meters).

The imaging system 300 can use measurements acquired from the IMU 306 to improve the accuracy of measurements and calculations. The IMU 306 is configured to generate a signal indicating an acceleration, an angular rate, and/or orientation of the stereoscopic multispectral imaging sensor 302. In aspects, the stereoscopic multispectral imaging sensor 302 may include a gyroscope, a magnetometer, and/or an accelerometer. The IMU measurements may be used to improve the accuracy of the imaging system 300 measurements and calculations.

The GPS receiver 304 is configured to generate real-time location information for the captured images to increase the accuracy of the location of the field elements. The outcome of the above measurements and calculations provides an accurate determination of the location of the field elements 1004, either relative to the vehicle 1002 or positioned on an absolute scale, using the GPS receiver 304.

Figure 4:
FIG. 4 is a top view of the imaging system of FIG. 1 mounted to the agricultural vehicle, in accordance with aspects of the present disclosure.

Referring to FIG. 4, a top view of the imaging system 300 mounted to the agricultural vehicle 1002 is shown. By using a wide lens (e.g., about 120 degrees), the imaging system 300 has a field of view that encompasses the entire working width of the agricultural vehicle 1002.

Figure 5:
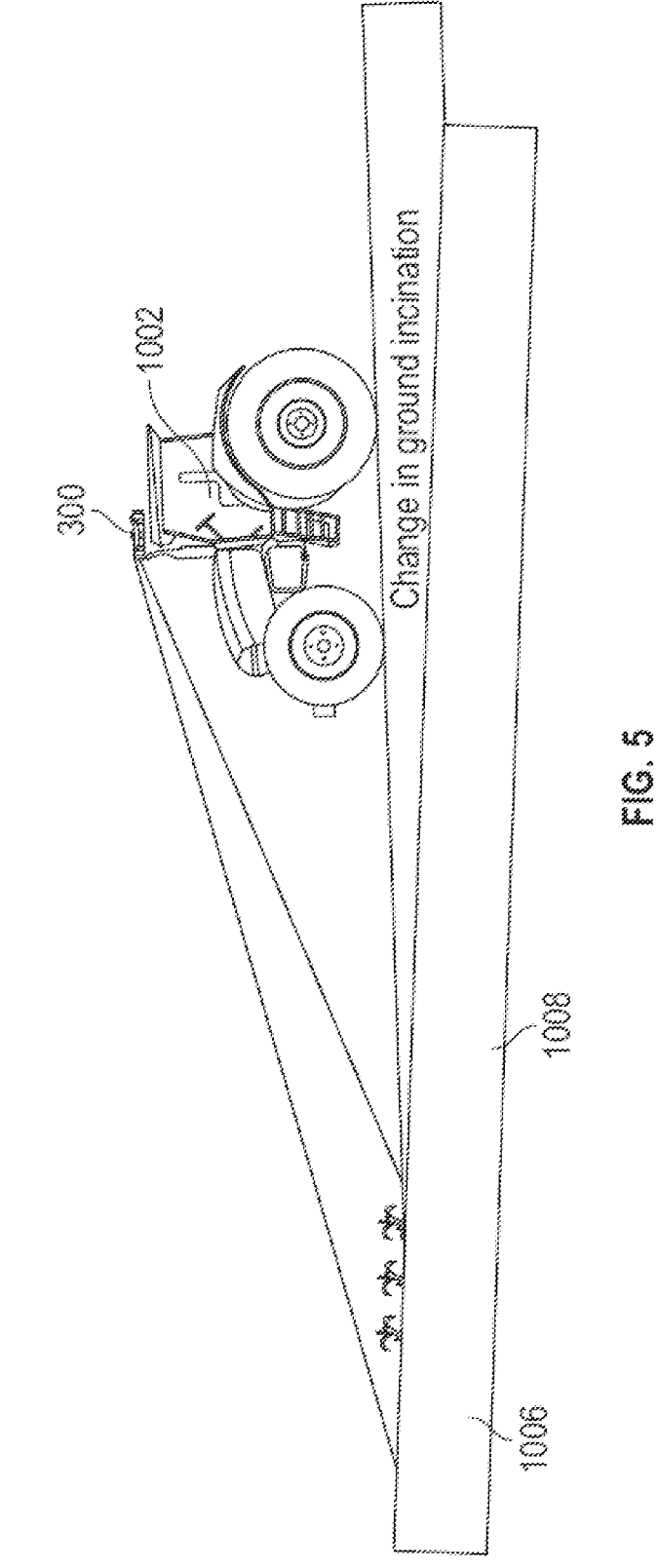
FIG. 5 is a top view of the imaging system of FIG. 1 mounted to the agricultural vehicle, in accordance with aspects of the present disclosure.

Referring to FIG. 5, a side view of a field 1008 with a change in ground incline is shown. The IMU 306 of the imaging system 300 enables accurate detection of the field elements 1004 even when there is a change in ground incline by providing the angle and direction of the imaging system 300 relative to the field elements 1004.

Referring to FIG. 6, there is shown a flow chart of an exemplary processor-implemented approach 600 for detecting, identifying, localizing, and/or determining characteristics of field elements 1004, and detecting, identifying, localizing, and/or determining field morphology in agricultural fields 1008 in real-time using a stereoscopic multispectral imaging sensor, mounted on an agricultural vehicle, as the agricultural vehicle moves through a field in accordance with aspects of the present disclosure. Although the blocks of FIG. 6 are shown in a particular order, the blocks need not all be performed in the specified order, and certain blocks can be performed in another order. For simplicity, FIG. 6 will be described below, with the controller 200 performing the operations. However, in various aspects, the operations of FIG. 6 may be performed in part by the controller 200 of FIG. 2 and in part by another device, such as a remote server. These variations are contemplated to be within the scope of the present disclosure.

Initially, at block 602, the controller 200 causes the stereoscopic multispectral imaging sensor 302 of the imaging system 300 to capture real-time images of the field as the agricultural vehicle 1002 moves through the field 1006. The imaging system 300 is mounted on the agricultural vehicle 1002. The captured images may be 2D and/or 3D. The captured images may include depth information.

In aspects, each pixel of the captured images may be assigned a pixel value representing a light intensity measurement in a light spectrum. The stereoscopic multispectral imaging sensor 302 is configured to acquire real-time images containing an entire operational working width of the agricultural vehicle using wide-angle lenses. In aspects, the controller 200 may perform real-time image registration and/or alignment between the multispectral images, for example, aligning an IR image and a red light image.

In aspects, the controller 200, using information from the stereoscopic multispectral imaging sensor 302, can calculate distances of all elements in the acquired images in order to create a depth map. The controller 200 may determine, for example, the position and orientation of the imaging system 300 with respect to the field 1006, the morphology of the field itself, and/or the detection of terrain changes (FIG. 5) based on the depth map. These measurements and calculations are used to increase the accuracy of the estimated field element 1004 location. More specifically, the estimated location based on the images is affected by the relative location and orientation between the camera and the sensed field element and the estimation of the distance between the imaging system 300 and the field element 1004. Both factors are accurately calculated using a combination of image processing from the imaging system 300 and the depth map.

At block 604, the controller 200 identifies, in real-time, field elements based on analyzing the captured real-time images. The field elements may be determined based on light-intensity images in different light spectrums.

At block 606, the controller 200 determines, in real-time, characteristics, including a vegetation index, of the identified field elements, by analyzing the captured real-time image as a standalone image or in combination with each other. A vegetation index is a single value calculated by transforming the observations from multiple spectral band images. The vegetation index can be generated, for example, by using two or more spectral image bands. The vegetation index is used to enhance the presence of green vegetation features and thus help to distinguish them from the other objects present in the image. The vegetation index may be used as an input to a machine-learning model for field element 1004 identification.

At block 608, the controller 200 determines, in real-time, a field morphology as the agricultural vehicle moves through the field based on the captured real-time images.

At block 610, the controller 200 accesses sensor data from the IMU 306 (FIG. 3). The data from the IMU 306 may include, for example, the acceleration sensor data, magnetometer data, and/or gyroscope sensor data. In aspects, global positioning system (GPS) sensor 304 data may be accessed. In aspects, the GPS location data may come from an external device, either wired or wirelessly.

At block 612, the controller 200 determines, in real-time, a location of identified field elements by combining the determined field morphology, the captured real-time images, the vegetation index, the acceleration sensor data, and/or gyroscope sensor data. In aspects, GPS sensor data may be used to refine the location information.

The controller 200 may be configured to control agricultural equipment using a standard or a proprietary communication protocol in order to apply the correct amount of chemical substance where needed and in the correct quantity in response to the identified field elements.

In aspects, the controller 200 may determine optimized parameters of the agricultural operation conducted by the agricultural vehicle based on the determined location and the characteristics of the identified field elements.

In aspects, the imaging system 300 may be networked to include a plurality of imaging systems 300 that are in wireless communication. The plurality of networked imaging systems 300 may share data node to node, or with a central facility.

The imaging system 300 may be used for adjusting harvesting height and adjusting tilling depth, as well as applications in other types of crops, such as high-value crops (grapes, tomatoes, berries, etc.). The disclosed technology provides the benefit of enabling multiple operations to be performed using the same apparatus only by changing the algorithms and software configuration.

The imaging system 300 may be used to determine spray boom height and/or deformation compensation. Due to their large size (more than 20 meters), spray booms can deform and oscillate during operation. Even though there are methods of controlling the boom angles, the control parameters of these adjustment methods can be improved by estimating the expected movement of the spray boom. The imaging system 300 can estimate the relative movement of the spray boom in real-time by capturing information related to field morphology, speed of movement, and/or optionally, information from the IMU 306 sensors.

One of the uses of the disclosed technology relates to the use of chemicals that are sprayed on a no-till field or a tilled field in order to eliminate all plants either before a crop season (known as green on brown or selective/spot spraying) or during a crop season (known as green-on-green spraying). Up until recently, sprayers applied a recommended dosage of pesticide chemicals in the whole field. The dosage applied would be determined so that all the plants (weeds) in the field are eliminated. In order to accomplish this, the dosage calculation uses the larger plants (weeds) of the field as a reference. As a result, excess chemicals are applied in the parts of the field with smaller or no plants (weeds).

Another use of the disclosed technology is to provide the required information related to the perception of the field (such as field morphology and/or obstacles) as well as the field elements (their location and characteristics) that can be used in automating field operations. Such automation can involve calculating and/or modifying field operation parameters based on sensory data and algorithms, as well as automating the entire full operation, including navigation of the agricultural equipment.

Figure 7:
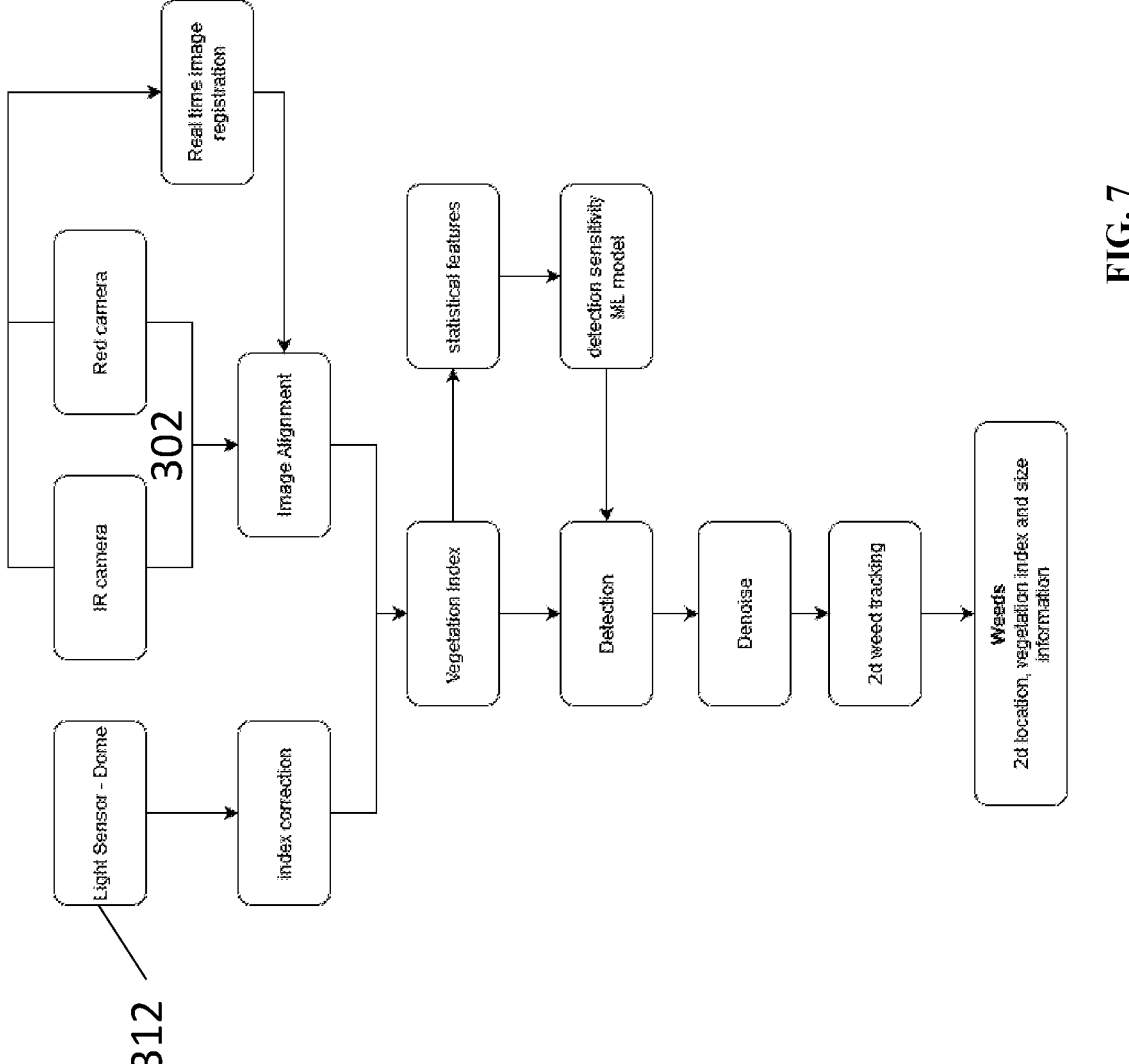
FIG. 7 is a flow diagram for the detection of field elements of FIG. 1, in accordance with aspects of the present disclosure.

Referring to FIG. 7, a flow diagram for the detection of field elements 1004 of FIG. 1 is shown. The imaging system 300 (FIG. 1) acquires a set of images which is processed by the controller 200, in order to detect and identify the field elements 1004 in each image set, as the agricultural equipment moves in the field and applies chemical substances. The controller 200 is configured to track the field elements 1004, for example, in a video and/or multiple images.

In aspects, in the case of detecting weeds within a field, the controller 200 provides an output of candidate weeds located in image coordinates based on calculating vegetation index based on red and infrared images (e.g., frames). In addition, by considering the relation between features of previous and current images, the controller 200 applies a 2D tracking algorithm on the candidate weeds, which provides a detection counter for each candidate weed.

Figure 8:
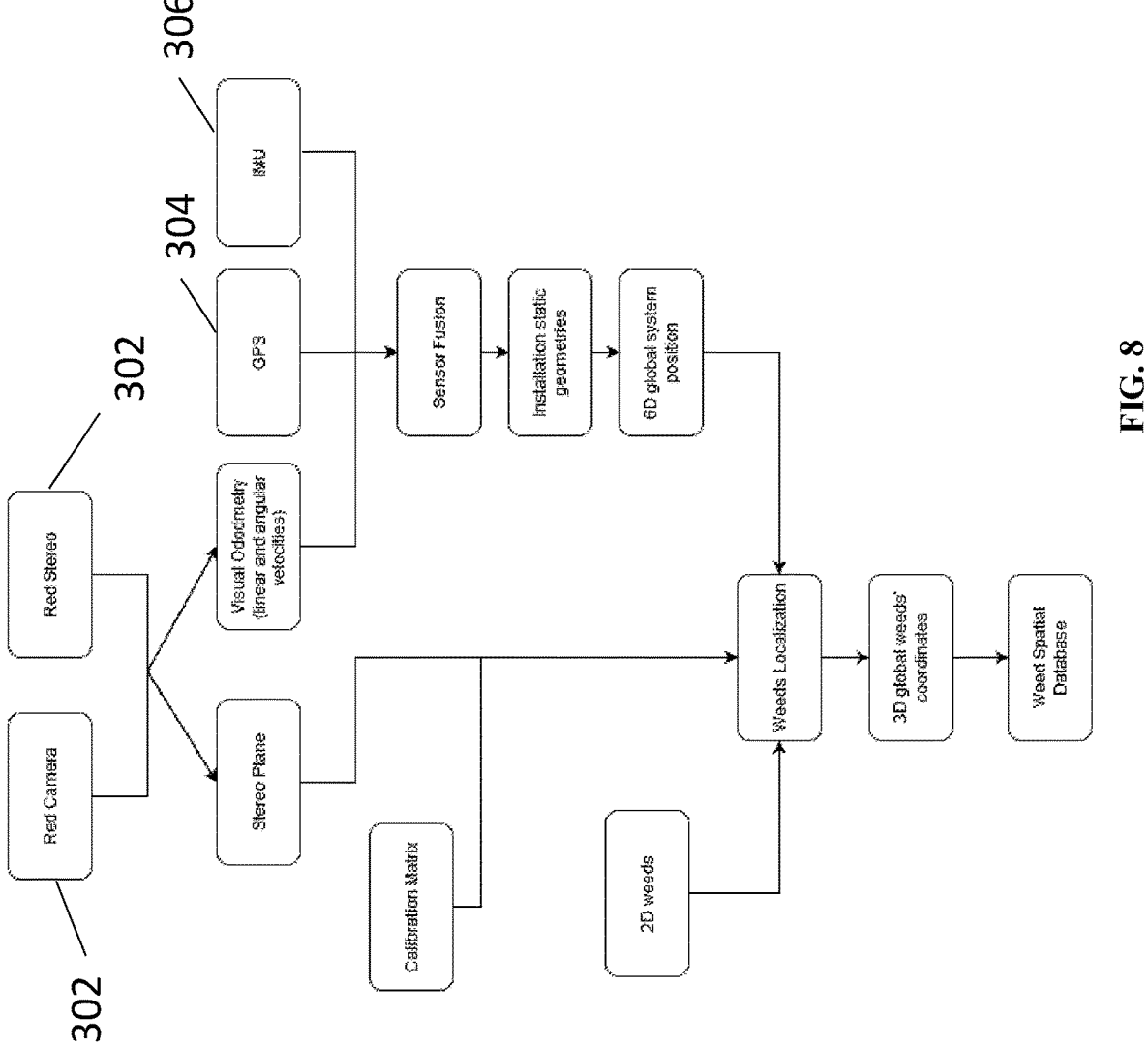
FIG. 8 is a flow diagram illustrating a method for localization of field elements and capturing field morphology, in accordance with aspects of the present disclosure.

Referring to FIG. 8, a flow diagram illustrating a method for localization of field elements 1004 and capturing field morphology is shown. The controller 200 captures information from the imaging sensors of the imaging system 300, the depth map, sensors (such as the accelerometer and/or the gyroscope), GPS, and through computer vision, artificial intelligence, and/or neural network methods, the controller 200 can determine, for example, a distance from all objects within the field of view of the camera system, a location of all field elements within the field of view of the camera system, a field morphology, a field element characteristics such as height, and an identification of field elements (plants, soil, weeds, specific morphologies and/or patterns etc.).

For example, in the case of localizing weeds within a field, the controller 200 accesses as an input a pair of stereo images, accelerometer, gyro, and/or GPS measurements. The controller 200 calculates linear and/or angular velocities from the pair of stereo images (i.e., Visual Odometry). Visual odometry, IMU sensor data, and/or GPS receiver raw measurements, may be fused via a Sensor Fusion model. The output of the Sensor Fusion module is the 6D global system location. Based on stereo triangulation, a stereo plane is generated from the stereo pair images. By combining the stereo plane, 6D system location, and/or the list of the candidate weeds, the controller 200 can calculate the 3D global location of the field elements (e.g., weeds). After the localization of the weeds, the weeds may be stored in a spatial database for further use.

Figure 9:
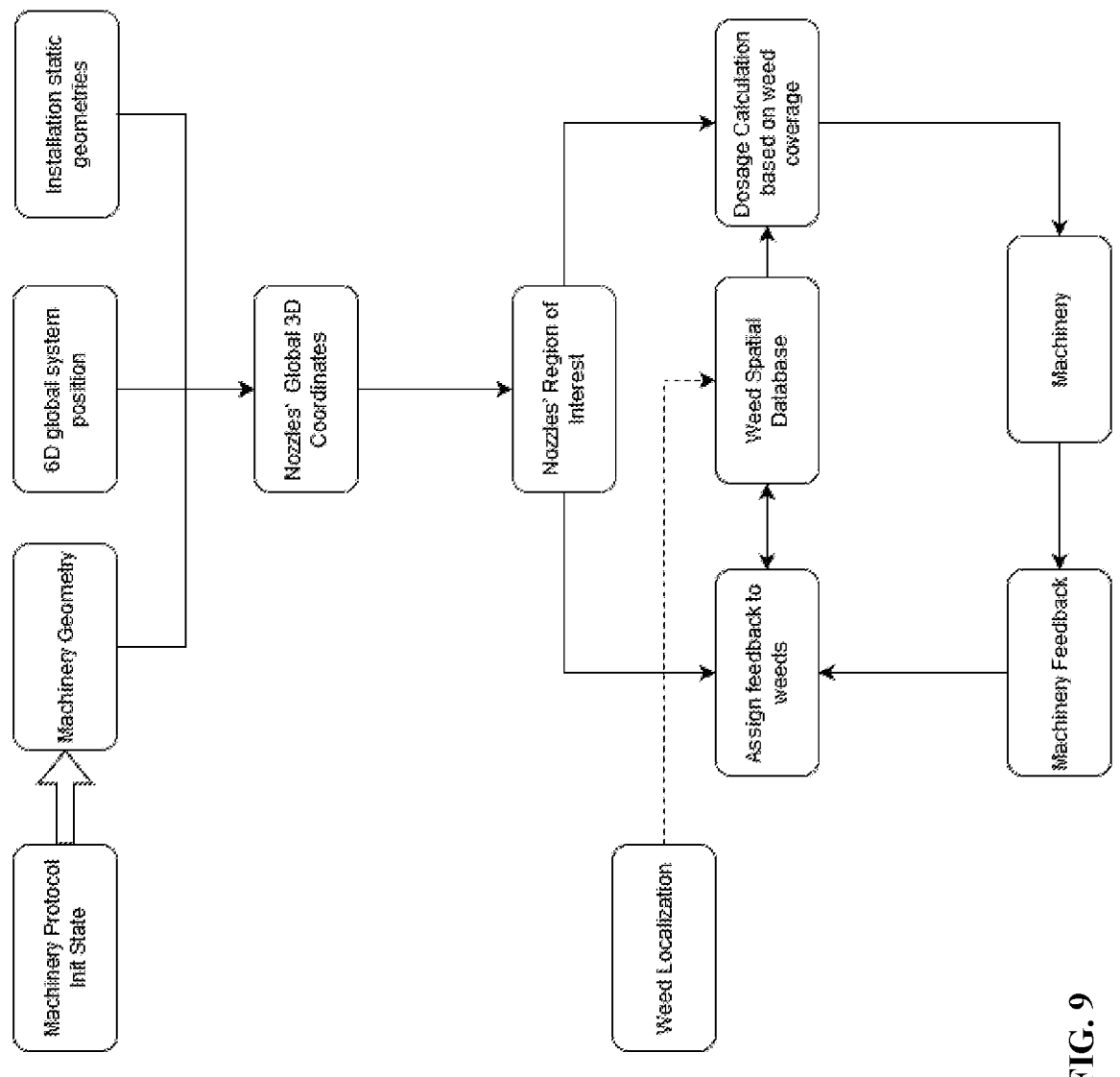
FIG. 9 is a flow diagram for a method for the determination of operational parameters, in accordance with aspects of the present disclosure.

Referring to FIG. 9, a flow diagram for a method for the determination of operational parameters is shown. The information of several parameters of the field elements 1004 (such as the location, size, and/or status) and the field morphology is combined with the operational requirements for each agricultural operation in order to evaluate, determine and quantify the control parameters of the agricultural equipment. For example, in the operation of weed elimination, the main operational parameter that is quantified and controlled in real-time is the dosage of chemicals applied on the field in order to eliminate all weeds while keeping the applied dosage at a minimum. As another example, in the operation of tilling an agricultural field, one of the core parameters which can determined by the present processes is the tilling depth and/or boom height. In another example, in the case of harvesting, the present processes can provide input for the optimal harvesting height.

For example, in the case of treating weeds within a field, the Spraying module uses as inputs the identified weed, the spatial database, 6D global system location, and/or machinery (vehicle 1002) geometry. Based on 6D global system location and machinery geometry, the module calculates each nozzle's region of interest in global coordinates. The Spraying module searches the spatial database for weeds that correspond to that region of interest of each nozzle. The Spraying module sums up the weed coverage under each nozzle, and based on that the Spraying module decides the proper dosage to be sprayed.

Certain aspects of the present disclosure may include some, all, or none of the above advantages and/or one or more other advantages readily apparent to those skilled in the art from the figures, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in aspects," "in various aspects," "in some aspects," or "in other aspects" may each refer to one or more of the same or different example Aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached figures are presented only to demonstrate certain examples of the disclosure. Other elements, steps, methods, and techniques that are insubstantially different from those described above and/or in the appended claims are also intended to be within the scope of the disclosure.

What is claimed is:

1. An imaging system usable with an agricultural vehicle as the agricultural vehicle moves through a field, comprising:

a stereoscopic multispectral imaging sensor configured to capture images of the field in real-time;

an inertial measurement unit (IMU) configured to monitor:

angle and direction of the stereoscopic multispectral imaging sensor relative to field elements of the field; and morphology of the field including ground incline;

a processor in communication with the stereoscope multispectral imaging sensor and the IMU; and a memory, including instructions, stored thereon, which, when executed by the processor, cause the imaging system to:

determine characteristics of the field elements within the field in which the agricultural vehicle is moving based on the captured real-time images, wherein one of the determined characteristics of the field elements is a vegetation index;

determine:

a morphology of the field in which the agricultural vehicle is moving based on the captured real-time images of the stereoscopic multispectral imaging sensor and ground incline determined with the IMU; and the angle and direction of the stereoscopic multispectral imaging sensor relative to the field elements with the IMU;

combine the real-time images, the determined characteristics of the detected field elements, and the determined morphology of the field including the angle and direction of the stereoscopic multispectral imaging sensor and the ground incline determined with the IMU; and determine a location of the detected field elements based on the combined real-time images, determined characteristics of the detected field elements, and the determined field morphology including the angle and direction of the stereoscopic multispectral imaging sensor and the ground incline determined with the IMU.

2. The imaging system of claim 1, wherein the instructions, when executed by the processor, further cause the imaging system to:

determine optimized parameters of the agricultural operation conducted by the agricultural vehicle based on the determined location and the characteristics of the identified field elements.

3. The imaging system of claim 1, wherein the instructions, when executed by the processor, further cause the imaging system to:

communicate the determined parameters to an agricultural vehicle controller for controlling parameters of the agricultural operation.

4. The imaging system of claim 1, wherein each pixel of the captured images is assigned a pixel value representing a light intensity measurement in a light spectrum space.

5. The imaging system of claim 1, wherein the stereoscopic multispectral imaging sensor can acquire images containing an entire operational working width of the agricultural vehicle using wide-angle lenses.

6. A processor-implemented method for detecting, identifying, localizing, and/or determining characteristics of field elements and field morphology in agricultural fields in real-time using a stereoscopic multispectral imaging sensor, mounted on an agricultural vehicle, the method comprising:

capturing, by the stereoscopic multispectral imaging sensor, real-time images of the field as the agricultural vehicle moves through the field, wherein each pixel of the captured images is assigned a pixel value representing a light intensity measurement in a light spectrum, wherein the stereoscopic multispectral imaging sensor is configured to acquire real-time images containing an entire operational working width of the agricultural vehicle using wide-angle lenses;

identifying, in real-time, field elements based on analyzing the captured real-time images as light-intensity images in different light spectrums;

determining, in real-time, characteristics, including a vegetation index, of the identified field elements, by analyzing the captured real-time images as a standalone image or in combination with each other;

determining, in real-time, a field morphology as the agricultural vehicle moves through the field based on the captured real-time images;

accessing at least one of angle or direction of the stereoscopic multispectral imaging sensor relative to the identified field elements from an IMU; and determining, in real-time, a location of identified field elements by combining the field morphology, the captured real-time images, and at least one of the angle or direction of the stereoscopic multispectral imaging sensor relative to the identified field elements.

7. The processor-implemented method of claim 6, further comprising:

determining in real-time agricultural operation parameters corresponding to a specific field element of the field elements based on the determined location and characteristics of the specific field element.

8. The processor-implemented method of claim 6, wherein the determined parameters are communicated to a controller of the agricultural vehicle to adjust the agricultural operation parameters.

9. The processor-implemented method of claim 6, further comprising detecting, identifying, and localizing weeds as the agricultural vehicle moves through a field based on the determined location.

10. The processor-implemented method of claim 9, further comprising:

determining an amount of a substance to be applied on each of the detected, identified, and localized field elements based on the determined characteristics; and communicating with a controller of the agricultural vehicle to apply the determined amount of the substance on the determined location of the field element.

11. A processor-implemented method of using an imaging sensor apparatus, mounted on an agricultural vehicle as the agricultural vehicle moves through a field, to eliminate weeds in a till or no-till field, in real-time, the method comprising:

accessing real-time images from an image sensor;

determining, in real-time, characteristics, including a vegetation index of field elements;

detecting field elements in real-time using the vegetation index;

identifying potential weeds based on comparing the vegetative index to a threshold;

determining one or more of angles or directions of the image sensor relative to the identified weeds with an inertial measurement unit (IMU);

determining at least one of an application rate or a weed coverage based on the determined characteristics of the identified weeds; and localizing the identified weeds based on sensor data including the real-time images and one or more of the angles or directions of the image sensor relative to the identified weeds.

12. The processor-implemented method of claim 11, further comprising:

determining an amount of a substance to be applied on each of the detected, identified, and localized field elements based on the determined characteristics.

13. The processor-implemented method of claim 12, further comprising:

communicating with a controller of the agricultural vehicle to apply the determined amount of the substance on the determined location of the field element.

14. The processor-implemented method of claim 11, wherein the sensor data includes at least one of GPS sensor data, gyroscope data, or accelerometer data.

15. The processor-implemented method of claim 11, wherein the real-time images are captured by a stereoscopic multispectral imaging sensor.

16. The processor-implemented method of claim 15, wherein the stereoscopic multispectral imaging sensor is configured to acquire real-time images containing an entire operational working width of the agricultural vehicle using wide-angle lenses.

17. The processor-implemented method of claim 11, wherein each pixel of the captured real-time images is assigned a pixel value representing a light intensity measurement in a light spectrum.

18. The processor-implemented method of claim 11, wherein the vegetation index of the identified field elements is determined by analyzing the accessed real-time images of the field in different light spectrums.

* * * * *